Figures 1, 13:
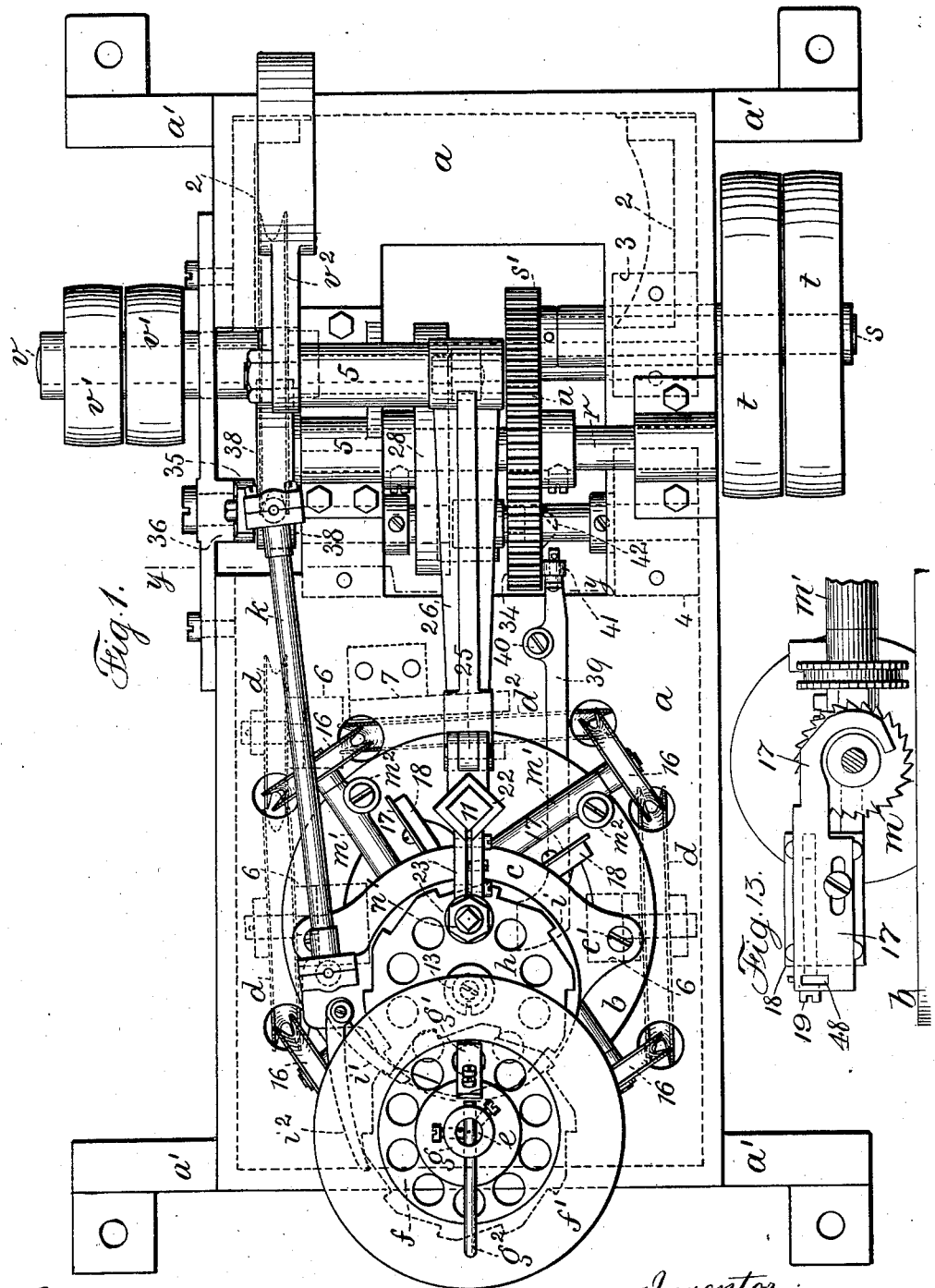

No. 676,187. Patented June 11, 1901.
J. A. GRIMM.
MACHINE FOR SHELLING NUTS.
(Application filed July 19, 1900.)

(No Model.) 3 Sheets—Sheet 1.

Witnesses:

Inventor:
John Andrew Grimm
per L. W. Serrell & Son Attys.

No. 676,187. Patented June 11, 1901.
J. A. GRIMM.
MACHINE FOR SHELLING NUTS.
(Application filed July 19, 1900.)
(No Model.) 3 Sheets—Sheet 2.
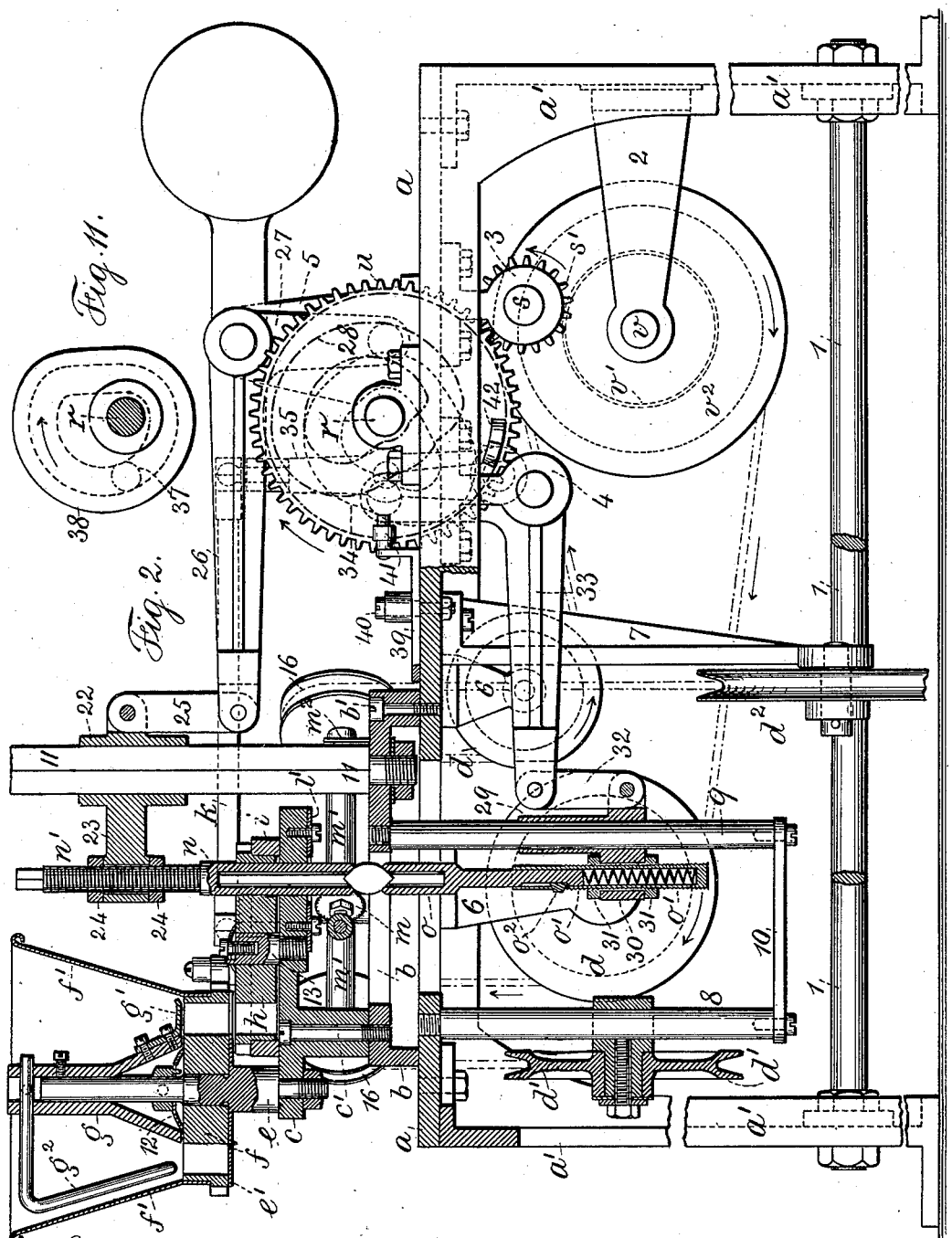

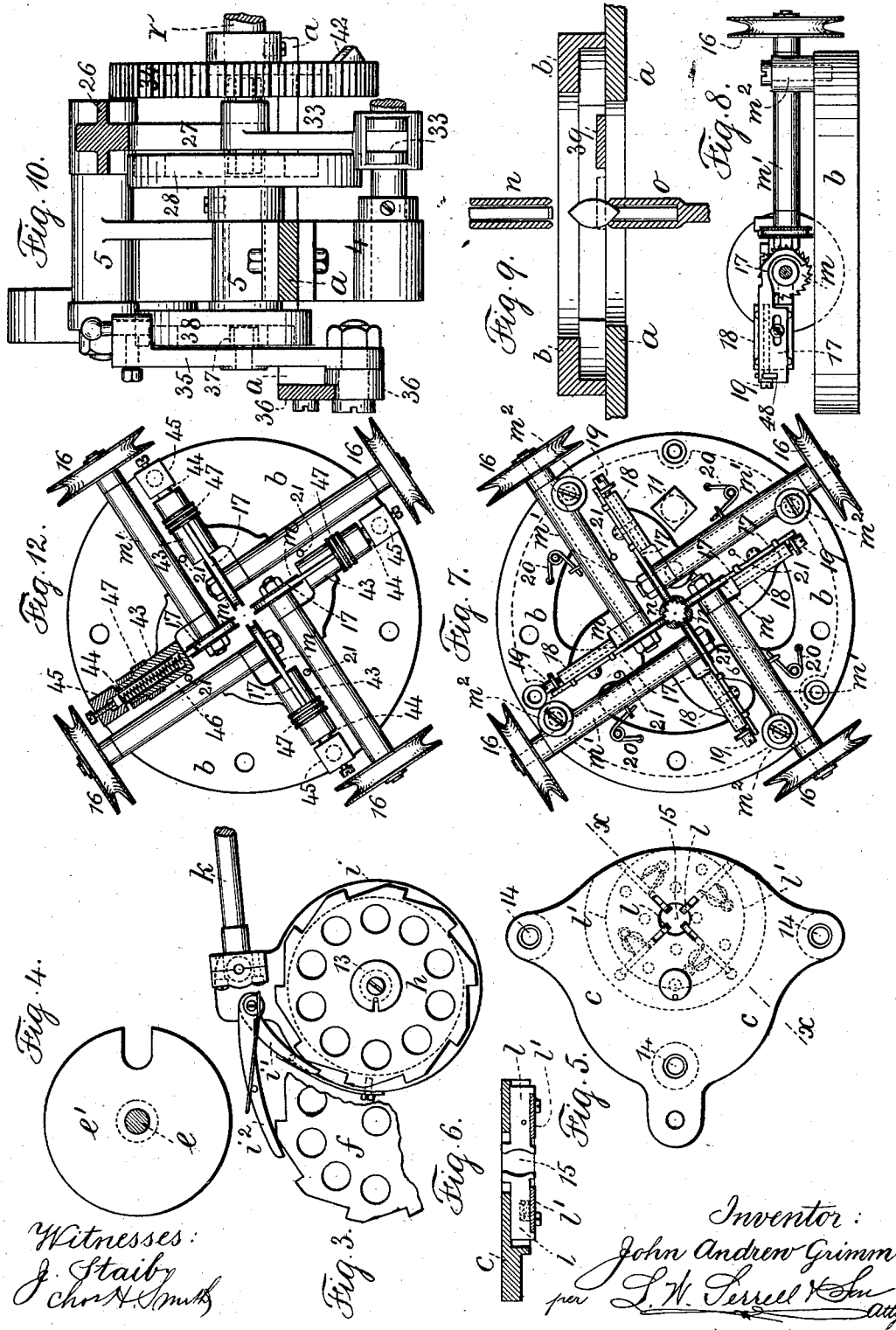

UNITED STATES PATENT OFFICE.

JOHN A. GRIMM, OF NEW YORK, N. Y.

MACHINE FOR SHELLING NUTS.

SPECIFICATION forming part of Letters Patent No. 676,187, dated June 11, 1901.

Application filed July 19, 1900. Serial No. 24,132. (No model.)

*To all whom it may concern:*

Be it known that I, JOHN ANDREW GRIMM, a citizen of the United States, residing at the borough of Manhattan, in the city, county, and State of New York, have invented a new and useful Improvement in Machines for Shelling Nuts, of which the following is a specification.

My invention relates to a power-operated automatic machine for severing the shells of nuts by scoring or incising for the ready removal of the meat.

In carrying out my invention the nuts are placed in a hopper and are agitated to cause the same to pass endwise into holes in the hopper-bottom. From these holes the nuts pass one at a time into coinciding holes of a carrier-disk placed below the hopper-bottom, and for this purpose the carrier-disk and hopper-bottom are simultaneously rotated. Vertically-moving finger-bars engage one nut at a time and push the same out of a hole in the carrier-disk and down through a coinciding hole in an auxiliary bed and then between a series of radially-placed pairs of revolving circular saws mounted on spring-actuated supports, and which saws sever the shell by scoring or incising the same lengthwise from point to point. The finger-bars are positively actuated, yielding, and adjustable, and suitable devices are employed for progressively operating the various parts for feeding the nuts, operating the circular saws, and removing the nuts from the finger-bars, after which the shells and meat may be separated by hand. All of these devices are hereinafter more particularly set forth.

In the drawings, Figure 1 is a plan view representing my improvement. Fig. 2 is a partial elevation and longitudinal section. Fig. 3 is a plan view representing the carrier-disk and a part of the hopper-bottom with the holes for the nuts and the means for rotating the same. Fig. 4 is a plan of the disk below the hopper-bottom. Fig. 5 is a plan of the auxiliary bed through which the nuts pass. Fig. 6 is a cross-section of the same at $x\,x$. Fig. 7 is a plan of the first auxiliary bed and the circular saws and means for operating the same. Fig. 8 is a partial section and elevation of two saw devices of Fig. 7. Fig. 9 is a cross-section through the main and the first auxiliary bed and a section of the finger-bars. Fig. 10 is a partial cross-section and elevation at $y\,y$ of Fig. 1. Fig. 11 is a cross-section of a shaft and elevation of the cam for imparting motion to the hopper and carrier-disk. Fig. 12 is a plan and partial section of the modification of the parts shown in Fig. 7, and Fig. 13 is a view showing the saws and gage-bars on a larger scale.

The main bed $a$ is provided with suitable supporting-legs $a'$, and on one end of the main bed I provide an auxiliary open-center bed $b$ and screws $b'$ for holding the bed $b$ to the main bed. Above the auxiliary bed $b$ is a second auxiliary bed $c$, secured by screws $c'$, passing through holes 14 in projections from the under side of the said bed $c$ to the auxiliary bed $b$. The supporting-legs of the main frame are preferably connected by tie-rods 1, and upon and connected to the upper and lower surface of the main bed are bracket-bearings 2, 3, 4, and 5 for the parts hereinafter described. I also employ bracket-bearings 6 and 7, there being several of the bracket-bearings 6. I further employ a depending post 8 from the main bed $a$ and another post 9 from the auxiliary bed $b$, the lower free ends of which posts are connected by a strap 10, and a series of pulleys $d$ is pivotally connected to the brackets 6. A pulley $d'$ upon a sliding adjustable bearing is connected to the post 8, and a pulley $d^2$ is connected to the bracket 7. I provide a post $e$, connected by a stem and nut at the lower end of the auxiliary bed $c$ and rising therefrom, and a notched disk $e'$ is secured to the post.

The hopper-bottom $f$ is a perforated disk—that is to say, there is a series of similarly-spaced-apart holes at the same distance from the center of the disk or hopper-bottom—and the edge is made with teeth. This will be apparent from Figs. 1, 2, and 3 of the drawings. The hopper $f'$ is of sheet metal connected to the bottom $f$ and flaring. Within the hopper surrounding and connected to the post $e$ is a guide-sleeve $g$, to which is connected a cover-plate $g'$, the position of which is fixed and which is of sufficient area to close over one hole of the hopper-bottom at a time. A stirrer-rod $g^2$ is connected to the guide-sleeve $g$, said stirrer-rod having an arm or end passing down toward the hopper-bottom and inclined at about the same angle as the hopper sides. The lower end of the guide-sleeve $g$ is flaring, so as to cover the portion of the hopper-bottom within the line of the holes. Within the open lower end of the guide-sleeve is a spring device 12, clamped to the post $e$, the office of which is to hold down the hopper-bottom against the fixed disk $e'$ on the under side thereof. The nuts, which, by preference, are pecan-nuts, are placed loosely in the hopper, and the lowermost nuts are free to pass into all of the holes except the one covered by the plate $g'$. They are assisted in passing into the holes by the stirrer $g^2$ as the hopper revolves.

A post 11, of angular cross-section, is connected to and rises straight up from the auxiliary bed $b$, the office of which will be hereinafter described. A center pin 13 screws into the auxiliary bed $c$, and surrounding this center pin is a perforated carrier-disk $h$, also provided with edge teeth, as will be seen from Figs. 1, 2, and 3. Surrounding this carrier-disk and fitting an angular recess in its periphery is a guide-ring $i$, having a projection at one side to which the pawls $i'$ $i^2$ are pivoted. These pawls are spring held or actuated, one resting against the periphery of the hopper-bottom $f$ and the other against the periphery of the carrier-disk $h$, and a connecting-rod $k$ is at one end also pivoted to the projection from the said guide-ring $i$, the reciprocation of which connecting-rod, together with the forward-and-backward swinging movement of the guide-ring, causes the pawls $i'$ $i^2$ to engage the teeth of the hopper-bottom and the carrier-disk, so that the said parts are simultaneously turned, one tooth at a time, in the same direction, so as to permit one hole of the hopper-bottom $f$ and one hole of the carrier-disk $h$ to vertically coincide, as shown in Fig. 2, with each movement of the said parts, so that as a nut in a hole of the hopper-bottom comes under the cover-plate $g'$ it is free to fall from the hopper-bottom into the carrier-disk, and in this manner the nuts are transferred one at a time from the holes in the hopper-bottom to the holes in the carrier-disk, and the nuts in the holes in the carrier-disk are carried around so that one hole in said carrier-disk at a time coincides vertically with the hole in the auxiliary bed $c$ for the operation of the parts to be hereinafter described.

The auxiliary bed $c$ at the center hole 15 is radially slotted for spring-actuated bars $l$, (see Figs. 5 and 6,) which bars are held in place by a retaining-plate $l'$ on the under side of the said bed. A series of double-radial circular saws $m$ are mounted upon shafts passing through sleeves $m'$, and the said sleeves $m'$ are mounted upon pivot-posts $m^2$ on the auxiliary bed $b$. (See specially Figs. 1 and 7.) The shafts of the saws are each provided with a pulley 16 on the opposite end and by which the shafts and saws are rotated. Between each pair of radial circular saws I place a gage-bar 17, and each sleeve $m'$ is provided with a supporting-head 18, connected thereto by a bracket. On the free end of each head 18 is an adjusting-screw 19, and the back end of each gage-bar is mortised, as shown at 48, Figs. 8 and 13, to receive part of a rib on said adjusting-screw 19, the said gage having ways provided therefor by projections of the head on the opposite edges of the said gage-bar and said gage-bar being slotted for a screw passing through the same into the head, which parts are shown clearly in Figs. 7 and 8, the said projections, slot, and screw permitting the gage-bar to move longitudinally with the rotation of the adjusting-screw 19.

The portion of the gage-bar between the circular saws is of hook shape, the outer edge thereof on a horizontal plane being more distant from the center of the circular saws than the adjacent portions above and below the same and which portions are with reference to the center of the circular saw at about angles of forty-five degrees. This construction of the curved end of the said gage-bar provides for less of the teeth at the horizontal center being available than are available above and below the said points, and I employ springs 20, one end of each of which is connected to the bed $b$ and the opposite ends to eyes upon the sleeves $m'$ for the purpose of forcing the sleeves and the saws toward the vertical center of the bed $b$, and I employ stops 21 on the bed $b$ to limit the movement of the sleeves, so as to prevent the radial circular saws from coming into actual contact with one another.

A sleeve 22 surrounds the rising post 11, and a socket-arm 23 extends out from the said sleeve, and passing through the said socket-arm is a finger-bar $n$, screw-threaded upon its upper end or stem $n'$ and provided with nuts 24 upon the opposite sides of the socket-arm, so as to adjustably connect the said finger-bar $n$ to the said socket-arm. The finger-bar $n$ points downward and moves vertically through the hole in the carrier-disk and in the auxiliary bed $c$ for the purpose of pushing the nuts one at a time out of the said holes to be operated upon by the circular saws, and I provide a finger-bar $o$, pointing upward and moving vertically, which finger-bar is adapted to come partially up into the opening 15 in the bed $c$ to receive the lower end of the nut, the finger-bars $n$ and $o$ operating together to remove the nut and to hold the same while being operated upon by the saws, there being sufficient space between the fingers of said bars for the pairs of circular saws to operate, Fig. 7 showing a section of the fingers of the bar $n$ with the saws in the openings between the same.

The finger-bar $o$ has a stem passing down into a threaded sleeve $o'$, the threaded sleeve passing through the socket 30 of the sleeve 29, there being nuts 31 upon the threaded sleeve $o'$ at opposite ends of the socket 30 to adjustably connect the threaded sleeve $o$ in place; and I provide the stem of the finger-bar $o$ with a cut-away portion and a key $o^2$ in the same and in the threaded sleeve $o'$ and a spring in said threaded sleeve, acting upwardly against the finger-bar, so that while said spring keeps the finger-bar normally projected to its full extent the said finger-bar is capable of a yielding depression to the extent of the slot in its stem, and which movement is controlled by the key, said parts being specially shown in Fig. 2.

The sleeve 29 surrounds the post 9 and is vertically movable thereon, and the sleeve 22 is connected by a link 25 with a rocker-arm 26, pivoted to a shaft passing through the hub 5, on the other end of which shaft is a weighted arm, (see Figs. 1 and 2,) the rocker-arm, shaft, and weighted arm being connected so as to work together, the rocker-arm 26 being made with a depending arm 27, carrying a roller, which roller is in the groove of a cam 28 upon the shaft $r$, in suitable bearings, upon the upper surface of the bed $a$. The sleeve 29 is connected by a link 32 to a rocker-arm 33, pivoted to the bracket-bearing 4, upon the upper end of which is a roller in the groove of the cam 34, which cam 34 is also on the shaft $r$, the said cams with the rotation of the shaft $r$ imparting a swinging movement to the arms 26 and 33 and through the links 25 and 32 vertical movements to the sleeves 22 and 29 and the finger-bars $n$ and $o$, the said movements being timed to carry out the operation of the device.

A rocker-arm 35 is pivoted at its lower end to a bearing formed with the bracket-plate 36, which is secured upon one side of the bed $a$. This rocker-arm 35 is connected by a universal joint at its upper end to the connecting-rod $k$ for actuating the pawls $i'$ $i^2$, and the said rocker-arm 35 carries a roller 37 in the groove of the cam 38, which cam 38 is also upon the shaft $r$, and there are teeth $u$ upon the periphery of the cam 34, and this cam 34 is provided on one face with a cam projection 42, and pivoted at 40 to the bed $a$ of the machine is a swinging arm 39, having on one end a roller 41, adapted to come into engagement with the cam projection 42, said swinging arm 39 at its opposite end being enlarged and moving over the surface of the bed, so as to strike the nut after the same has passed through the saws and been released by the removal of the upper finger-bars $n$. (See Fig. 9.)

The machine is provided with two sources of power, the one for operating the mechanical devices—that is, the finger-bars and the pawls for turning the hopper-bottom and the carrier-disk—and the other power device for rotating the saws. The main power-shaft $s$ is in bearings 3 upon the under side of the bed $a$. This shaft carries a pinion $s'$, which meshes with the teeth $u$ of the cam 34, said power-shaft $s$ having fast and loose pulleys $t$, and by these means rotation is imparted to the shaft $r$ to actuate the cams 28, 34, and 38 to cause the operation of the parts heretofore described. The second or auxiliary power-shaft $v$ is also mounted in bearings 2 on the frame of the machine, and on the said power-shaft are fast and loose pulleys $v'$. This shaft $v$ carries a belt-wheel $v^2$, and the belt passing around the said wheel extends around the first pulley $d$, up over one of the pulleys 16, down around the pulley $d'$, up over the second pulley 16, down around the next pulley $d$, up over the next pulley 16, down around the pulley $d^2$, up over the last pulley 16, down around the last pulley $d'$, and so to the belt-wheel $v^2$, the adjustable pulley $d'$ being provided for taking up the slack of this operating-belt. In this manner all of the pairs of circular saws are rotated by the same belt at the same speed and the said saws are free to yield upon the pivot-posts $m^2$.

In the operation of the device further than as hereinbefore described each nut to be operated upon in a hole of the carrier-disk $h$ rests upon the spring-bars $l$ in the bed $c$, and as the finger-bar $n$ comes against the nut it forces the same through the hole in the carrier-disk down past the spring-bars, righting the nut with the movement, so that it occupies a truly vertical position, the point coming against the upper ends of the finger-bar $o$. As the nut continues the downward movement the saws come in contact with the nut at the lower point, and they cut through the shell and yield as the nut is forced down, passing over and through the sides and finally through the nut at the upper point, the construction of the gage-bars 17, as hereinbefore described, permitting the circular saws to cut deeper into the nuts at the points than at the sides, the said gage-bar determining the depth of the cut and being set so that the saws will just cut through the shell of the nut without injuring the meat. As the nut passes farther down past the saws the finger-bar $n$ is raised by its operating mechanism, so that the nut rests upon the upper end of the finger-bar $o$, which is momentarily held in place by its actuating mechanism. The arm 39 is then swung to knock the nut off the finger-bar $o$, so that the operations may be repeated.

The action of the pairs of circular saws upon the nut is peculiar—that is to say, there are eight lines of incision or scoring—which cut four sections of shell away from the nut, leaving a slender framework of shell of four portions connecting the respective ends and serving to temporarily hold the meat of the nut in place, so that thereafter a simple twist given by the fingers would be sufficient to sever this framework and free the meat. The movement of the saws is also peculiar, because the swinging movement provides for the saws cutting an incision of greater width than their thickness, so that they free themselves and are not liable to clog or stick in the shell.

In the modification shown in Fig. 12 the saws do not swing, but have a radial yielding movement, the sleeves $m'$ carrying the pulleys 16, the saws and their shafts being connected by brackets to sockets 43, said sockets being supported by sleeves 44 from posts 45, secured to the bed $b$, and within the sockets and sleeves there are springs 46, which yield as the nut is passed down between the saws. Screws are provided for applying tension to the springs 46, and nuts 47 are provided around the sockets 43 for adjusting the positions of the gage-bar 17. I do not consider this modification as advantageous as the devices shown in Fig. 7, because the saws acting by a straightaway yielding motion do not provide the clearance of the swinging saws.

I am aware that a machine has been heretofore devised for scoring or incising the shells of nuts, especially cocoa-nuts, by circular saws at opposite points of the shell that were caused to rotate and cut into the shell as the nut was passed between the saws; but in this device the shell was only scored and had to be cracked thereafter, the saws simply facilitating the cracking operation, so that the meat was removed from the nuts in a more satisfactory shape than in the old way; but the devices of the said machine were totally different from those employed by me.

I claim as my invention—

1. In a machine for shelling nuts, a hopper for holding the nuts, means for receiving and delivering one nut at a time from the hopper, devices for receiving the nuts one at a time from the hopper and advancing the same progressively, means for grasping the nuts and for moving the same downward, saws for scoring or incising the nuts in their downward movement and means for removing the nuts from the holding device, substantially as set forth.

2. In a machine for shelling nuts, a hopper for holding the nuts, means for receiving and delivering one nut at a time from the hopper, devices for receiving the nuts one at a time from the hopper and advancing the same progressively, means for grasping the nuts and for moving the same downward, saws for scoring or incising the nuts in their downward movement and means for removing the nuts from the holding device, and mechanical devices for effecting the operations of the various parts, substantially as set forth.

3. In a nut-shelling machine, the combination with a hopper, of a perforated hopper-bottom for receiving the nuts endwise, a notched disk beneath the hopper-bottom for preventing the nuts falling out, means for rotating the hopper-bottom and hopper and for causing the agitation of the nuts therein, means for holding the hopper-bottom against the disk, and means for covering over one hole of the hopper-bottom, substantially as set forth.

4. In a nut-shelling machine, the combination with a hopper, of a perforated hopper-bottom for receiving the nuts endwise, a notched disk beneath the hopper-bottom for preventing the nuts falling out, means for rotating the hopper-bottom and hopper and for causing the agitation of the nuts therein, means for holding the hopper-bottom against the disk, and means for covering over one hole of the hopper-bottom, and a carrier-disk having spaced-apart holes to receive the nuts one at a time from the hopper-bottom, and means for rotating the carrier-disk to progressively advance the nuts to the place of delivery, substantially as set forth.

5. In a machine for shelling nuts, the combination with the main bed and the auxiliary bed $c$, of a vertical post $e$ secured to the said auxiliary bed and carrying a notched disk $e'$, a hopper-bottom revolubly mounted on said post and having equally-spaced-apart holes surrounding the said post, a hopper rising from said hopper-bottom, teeth around the periphery of said hopper-bottom, a pawl and means for revolving said hopper-bottom and hopper, a spring device 12 above the hopper-bottom for holding the same down against the notched disk $e'$, a guide-sleeve $g$ surrounding the said post $e$ and flaring at its lower end, a cover-plate $g'$ secured to the flaring portion of the guide-sleeve $g$ and covering one of the holes in the said hopper-bottom, and a stirrer $g^2$ in the form of a bent arm connected to the guide-sleeve $g$ and adapted to stir the nuts in the hopper to insure their falling into the holes in the hopper-bottom, substantially as set forth.

6. In a machine for shelling nuts, the combination with the main bed and the auxiliary bed $c$, of a vertical post $e$ secured to the said auxiliary bed and carrying a notched disk $e'$, a hopper-bottom revolubly mounted on said post and having equally-spaced-apart holes surrounding the said post, a hopper rising from said hopper-bottom, teeth around the periphery of said hopper-bottom, a pawl and means for revolving said hopper-bottom and hopper, a spring device 12 above the hopper-bottom for holding the same down against the notched disk $e'$, a guide-sleeve $g$ surrounding the said post $e$ and flaring at its lower end, a cover-plate $g'$ secured to the flaring portion of the guide-sleeve $g$ and covering one of the holes in the said hopper-bottom, and a stirrer $g^2$ in the form of a bent arm connected to the guide-sleeve $g$ and adapted to stir the nuts in the hopper to insure their falling into the holes in the hopper-bottom, a center-pin 13 secured in and rising vertically from the auxiliary bed $c$, a carrier-disk $h$ mounted upon the said pin and having equally-spaced-apart perforations around the said pin for receiving the nuts, teeth on the periphery of said carrier-disk and means for rotating the same so that the holes in the said carrier-disk will coincide one at a time with the holes of the hopper-bottom, and a pawl and means for rotating the carrier-disk in unison with the rotation of the hopper-bottom, substantially as set forth.

7. In a machine for shelling nuts, the combination with the main bed and the auxiliary bed c, of a vertical post e secured to the said auxiliary bed and carrying a notched disk e', a hopper rising from said hopper-bottom, teeth around the periphery of said hopper-bottom, a pawl and means for revolving said hopper-bottom and hopper, a spring device 12 above the hopper-bottom for holding the same down against the notched disk e', a guide-sleeve g surrounding the said post e and flaring at its lower end, a cover-plate g' secured to the flaring portion of the guide-sleeve g and covering one of the holes in the said hopper-bottom, and a stirrer $g^2$ in the form of a bent arm connected to the guide-sleeve g and adapted to stir the nuts in the hopper to insure their falling into the holes in the hopper-bottom, a center-pin 13 secured in and rising vertically from the auxiliary bed c, a carrier-disk h mounted upon said pin and having equally-spaced-apart perforations around the said pin for receiving the nuts, teeth on the periphery of said carrier-disk, and means for rotating the same so that the holes in the said carrier-disk will coincide one at a time with the holes of the hopper-bottom, and a pawl and means for rotating the carrier-disk in unison with the rotation of the hopper-bottom, and a guide-ring i resting upon the auxiliary bed c and surrounding the carrier-disk h and to which the pawl devices for rotating the carrier-disk and hopper-bottom are pivoted, and a connecting-rod also pivoted to the said guide-ring, and means for reciprocating the connecting-rod to operate said parts in unison, substantially as set forth.

8. In a machine for shelling nuts, the combination with the hopper-bottom and the carrier-disk perforated for the reception of the nuts, and means for operating the same in unison and supports therefor, of an auxiliary bed c upon which the said parts are mounted, the said bed being perforated for the passage of one nut at a time in line with the perforations of the carrier-disk, spring-actuated radially-placed arms in slots in the said auxiliary bed, for holding the said nuts, and which arms are pressed aside as the nut passes through, a retaining-plate for the said spring-actuated radial arms, vertically-moving finger-bars adapted to grasp the nut at the respective pointed ends, the lower finger-bar coming up adjacent to the said arms l and the upper finger-bar passing through one hole in the carrier-disk and down through the hole in the auxiliary plate, and saws for severing or incising the shell of the nut with its downward movement, substantially as set forth.

9. In a machine for shelling nuts, the combination with the main bed and the auxiliary bed b, of a post 9 supported by the auxiliary bed and depending therefrom, a post 11 mounted upon said auxiliary bed and rising vertically therefrom, sleeves surrounding said posts and carrying projecting socket-arms, a finger-bar n and threaded stem n' thereto passing through the socket-arm carried by the post 11, and nuts upon said threaded stem for securing the same to the socket-arm, a threaded sleeve to the finger-bar o and nuts for securing the same to the socket-arm carried by the post 9, a spring in the threaded sleeve of the finger-bar o and a key for connecting the finger-bar o to the threaded sleeve whereby the finger-bar o is yielding, and means for actuating and vertically moving the said finger-bars at the proper time, substantially as set forth.

10. In a machine for shelling nuts, the combination with the main bed and the auxiliary bed b, of a post 9 supported by the auxiliary bed and depending therefrom, a post 11 mounted upon said auxiliary bed and rising vertically therefrom, sleeves surrounding said posts and carrying projecting socket-arms, a finger-bar n and threaded stem n' thereto passing through the socket-arm carried by the post 11, and nuts upon said threaded stem for securing the same to the socket-arm, a threaded sleeve to the finger-bar o and nuts for securing the same to the socket-arm carried by the post 9, a spring in the threaded sleeve of the finger-bar o and a key for connecting the finger-bar o to the threaded sleeve whereby the finger-bar o is yielding and means for actuating and vertically moving the said finger-bars at the proper time, links pivotally connected to the said sleeves and rocker-arms pivoted to the bed of the machine and to the said links, rollers upon the opposite ends of said rocker-arms, a shaft and means for revolving the same and cams upon the said shaft engaging the rollers of the rocker-arms for actuating the same in the finger-bars, substantially as set forth.

11. In a nut-shelling machine, the combination with the main bed, an auxiliary bed b, and means for receiving and progressively advancing the nuts one at a time, and means for engaging the same, of a series of double radially-acting circular saws, supports therefor, and means for revolving the same and a gage-bar between the circular saws, and means for adjusting the same to control the depth of cut of the saws, substantially as set forth.

12. In a nut-shelling machine, the combination with the main bed, an auxiliary bed b, and means for receiving and progressively advancing the nuts one at a time, and means for engaging the same, of a series of double radially-acting circular saws, supports therefor, and means for revolving the same and a gage-bar between the circular saws, and means for adjusting the same to control the depth of cut of the saws, the end of the said gage-bar between the saws having portions at varying distances from the teeth so as to control the depth of cut of the saws and cause them to cut through the shell deeper at the pointed ends of the nut than at the center, substantially as set forth.

13. In a machine for shelling nuts, the combination with the main bed and the auxiliary bed $b$, of a series of radially-placed circular saws in pairs, shafts on which the said saws are mounted, pulleys for operating the said shafts, sleeves surrounding the said shafts and pivotal supports connecting the said sleeves to the said auxiliary bed at points distant from the said saws, springs for moving the said parts and stops for limiting the movement whereby the said pairs of saws are revolved and given a swinging movement whereby a clearance incision is made in the nuts, substantially as set forth.

14. In a machine for shelling nuts, the combination with the main bed and the auxiliary bed $b$, of a series of radially-placed circular saws in pairs, shafts on which the said saws are mounted, pulleys for operating the said shafts, sleeves surrounding the said shafts and pivotal supports connecting the said sleeves to the said auxiliary bed at points distant from the said saws, springs for moving the said parts and stops for limiting the movement whereby the said pairs of saws are revolved and given a swinging movement by which a clearance incision is made in the nuts, bracket-supported heads connected to the sleeves, gage-bars supported by the said heads and projecting between the saws, means for adjusting the said gage-bars and for holding them to the said heads, substantially as set forth.

15. In a machine for shelling nuts, the combination with the bed, of a series of radially-placed circular saws in pairs, devices upon which said saws are mounted and by which they are rotated, pivots for the said parts distant from the saws and means for moving the saws up to the work whereby the saws are given a swinging movement producing a cut of greater width than the thickness of the saws, so that the saws run free, and stops for limiting the movement of the saws, substantially as set forth.

16. In a machine for shelling nuts, the combination with the bed, of a series of radially-placed circular saws in pairs, devices upon which said saws are mounted and by which they are rotated, pivots for the said parts distant from the saws, and means for moving the saws up to the work whereby the saws are given a swinging movement producing a cut of greater width than the thickness of the saws so that the saws run free, stops for limiting the movement of the saws, and gage-bars between the saws in pairs, said gage-bars having ends adjacent to the cutting portions of the saws of varying distances from the points of the teeth, and means for adjusting said gage-bars whereby the saws are permitted to cut deeper into the nuts at the points and respective ends than at the centers of the nuts, substantially as set forth.

17. In a machine for shelling nuts, the combination with a bed, of a series of radially-placed circular saws in pairs, devices upon which said saws are mounted and by which they are rotated, pivots for the said parts distant from the saws at right angles to the saw-axes and means for moving the saws up to the work whereby the saws are given a swinging movement producing a cut of greater width than the thickness of the saws, so that the saws run free, stops for limiting the movement of the saws, and a series of pulleys and bearings therefor beneath the main bed of the machine, and a power-pulley and means for operating the same, and a driving-belt passing around the main pulley and progressively and alternately around the series of pulleys beneath the bed and the pulleys upon the shafts of the saws whereby all of the saws are driven in the same direction in unison and by the same belt, substantially as set forth.

18. In a machine for shelling nuts, the combination with a bed, of a series of radially-placed circular saws in pairs, devices upon which said saws are mounted and by which they are rotated, pivots for the said parts distant from the saws and at right angles to the saw-axes, and means for moving the saws up to the work, whereby the saws are given a swinging movement producing a cut of greater width than the thickness of the saws, so that the saws run free, stops for limiting the movement of the saws, and a series of fixed pulleys and one adjustable pulley, and bearings therefor beneath the main bed of the machine, and a power-pulley and means for operating the same, and a driving-belt passing around the main pulley and progressively and alternately around the series of pulleys beneath the bed and the pulleys upon the shafts of the saws, whereby all of the saws are driven in the same direction in unison and by the same belt, substantially as set forth.

19. In a nut-shelling machine, the combination with a bed, of a series of radially-placed circular saws in pairs, shafts upon which the saws are mounted and pulleys for operating the same, and spring-actuated yielding supports for the said circular saws in pairs, whereby the saws are kept to the work but may yield for the varying diameters of the nut passing between the same, substantially as set forth.

20. In a nut-shelling machine, the combination with a bed, of a series of radially-placed circular saws in pairs, shafts upon which the saws are mounted and pulleys for operating the same, and spring-actuated yielding supports for the said circular saws in pairs, whereby the saws are kept to the work but may yield for the varying diameters of the nut passing between the same, and a gage-bar between the circular saws in pairs, and means for imparting a longitudinal and progressive forward - and - backward movement to said gage-bar to control the depth of cut of the saws, substantially as set forth.

21. In a nut-shelling machine, the combination with means for feeding the nuts one at a time, finger-bars for grasping the nuts and saws for scoring or incising the shells, and means for actuating the said finger-bars, of a pivoted swinging arm and means for actuating the same for striking the incised nut and knocking the same away from the machine, substantially as set forth.

22. In a nut-shelling machine, the combination with means for feeding the nuts one at a time, finger-bars for grasping the nuts and saws for scoring or incising the shells, and means for actuating the said finger-bars, of a pivoted swinging arm and a roller on one end of the said arm, a toothed wheel and a cam projection thereon adapted to engage the said arm, and means for operating the toothed wheel, substantially as set forth.

Signed by me this 17th day of July, 1900.

JOHN A. GRIMM.

Witnesses:
　HAROLD SERRELL,
　ARTHUR H. SERRELL.